United States Patent
McDonald, Jr. et al.

(10) Patent No.: US 7,225,472 B2
(45) Date of Patent: Jun. 5, 2007

(54) TRAINING GARMENT

(75) Inventors: Terry O. McDonald, Jr., 2768 S. Ivan Way, Denver, CO (US) 80227; Peggy E. McDonald, Denver, CO (US)

(73) Assignee: Terry O. McDonald, Jr., Denver, CO (US)

( * ) Notice: Subject to any disclaimer, the term of this patent is extended or adjusted under 35 U.S.C. 154(b) by 0 days.

(21) Appl. No.: 10/955,845

(22) Filed: Sep. 30, 2004

(65) Prior Publication Data
US 2005/0066409 A1 Mar. 31, 2005

Related U.S. Application Data

(60) Provisional application No. 60/507,411, filed on Sep. 30, 2003.

(51) Int. Cl.
*A41D 1/04* (2006.01)
(52) U.S. Cl. .......................................................... 2/102
(58) Field of Classification Search ..................... 2/69, 2/108, 102, 113–115, 93, 94, 69.5, 271, 107; 182/3–5; 244/151 R
See application file for complete search history.

(56) References Cited

U.S. PATENT DOCUMENTS

| | | | |
|---|---|---|---|
| 3,650,544 A * | 3/1972 | Cassell | 280/293 |
| 3,997,921 A * | 12/1976 | Knight | 2/75 |
| 4,429,419 A * | 2/1984 | Snyder | 2/102 |
| 4,449,253 A * | 5/1984 | Hettinger | 2/93 |
| 4,903,975 A * | 2/1990 | Weisbrodt et al. | 280/293 |
| 5,074,795 A * | 12/1991 | Clark | 434/253 |
| 5,154,096 A * | 10/1992 | Geller et al. | 74/551.8 |
| 5,226,820 A * | 7/1993 | Pearson | 434/247 |
| 5,303,944 A * | 4/1994 | Kalmus | 280/288.4 |
| 5,382,040 A * | 1/1995 | Nanassi | 280/293 |
| 5,395,130 A * | 3/1995 | Rubin | 280/304 |
| 5,514,019 A * | 5/1996 | Smith | 441/88 |
| 5,540,188 A * | 7/1996 | Heinrichs | 119/770 |
| 5,619,751 A * | 4/1997 | Ray et al. | 2/102 |
| 5,634,439 A * | 6/1997 | O'Brien | 119/770 |
| 6,120,050 A * | 9/2000 | Tillim | 280/293 |
| 6,167,572 B1 * | 1/2001 | Naumovitz | 2/227 |
| 6,240,564 B1 * | 6/2001 | Te Kanawa | 2/115 |
| 6,244,612 B1 * | 6/2001 | Henderson | 280/293 |
| 6,488,302 B2 * | 12/2002 | Coates | 280/293 |

* cited by examiner

*Primary Examiner*—Tejash Patel
(74) *Attorney, Agent, or Firm*—Joseph R. Kelly; Westman, Champlin & Kelly, P.A.

(57) ABSTRACT

The present invention is a garment that is fastened about the torso of a user such that that rotation of the garment about the user is inhibited. The garment also illustratively includes a handle extending from a back portion of the garment.

9 Claims, 7 Drawing Sheets

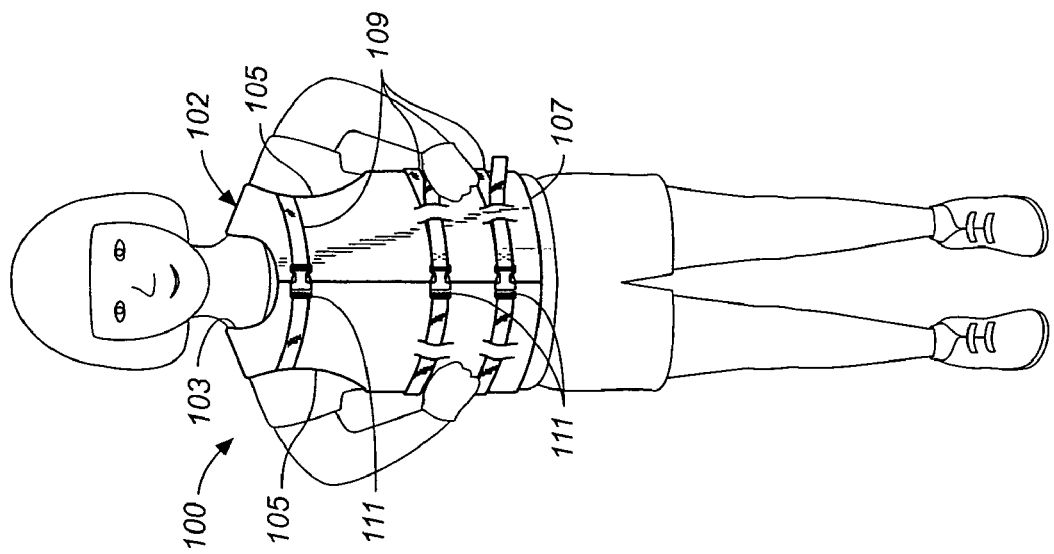
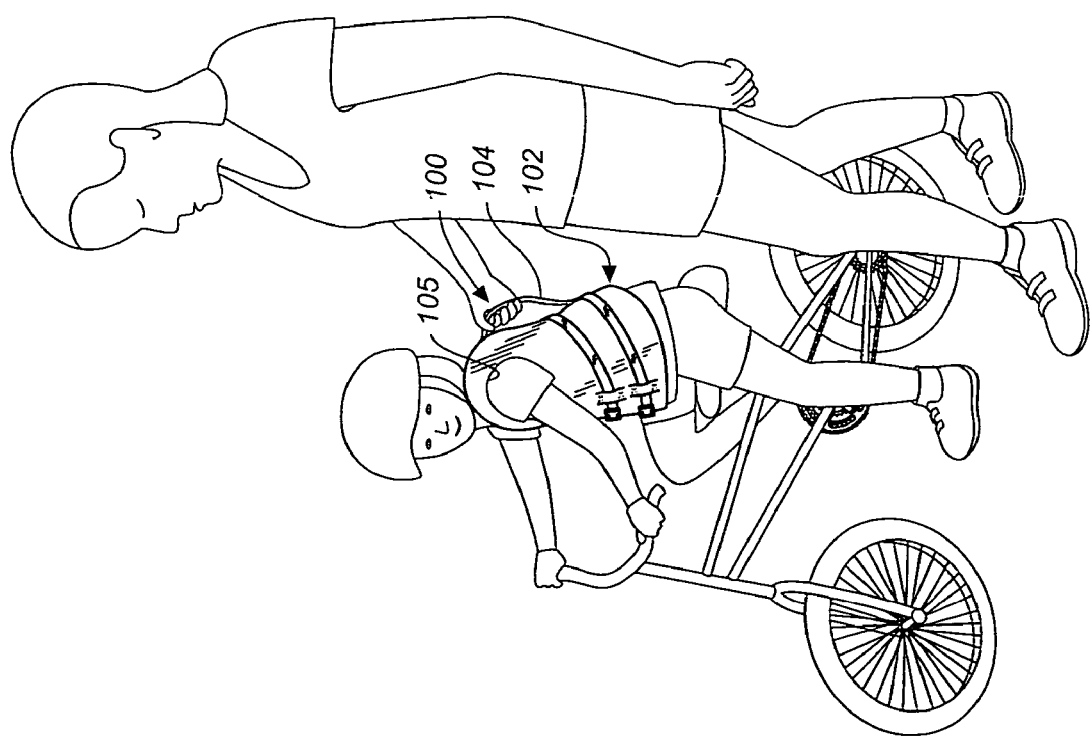

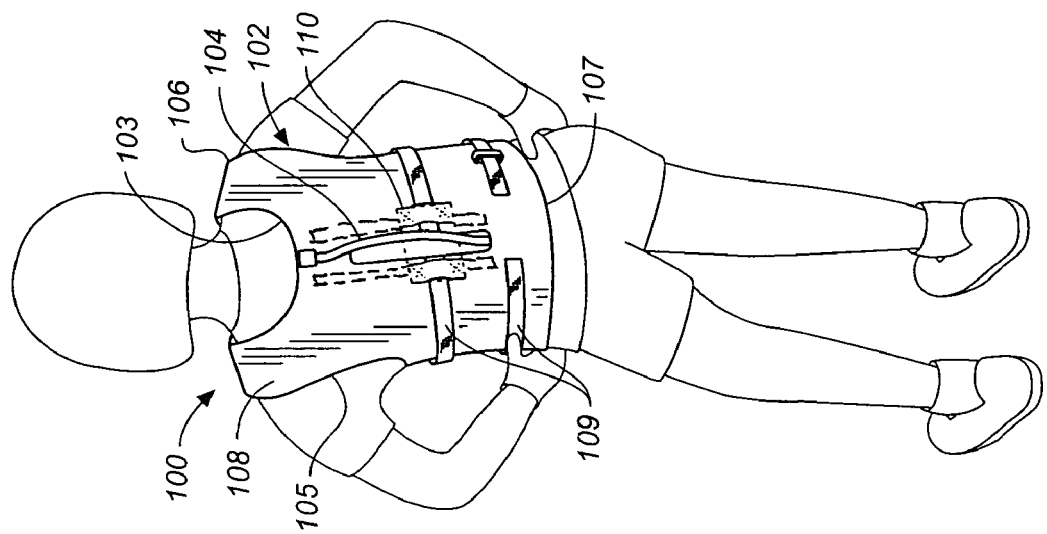
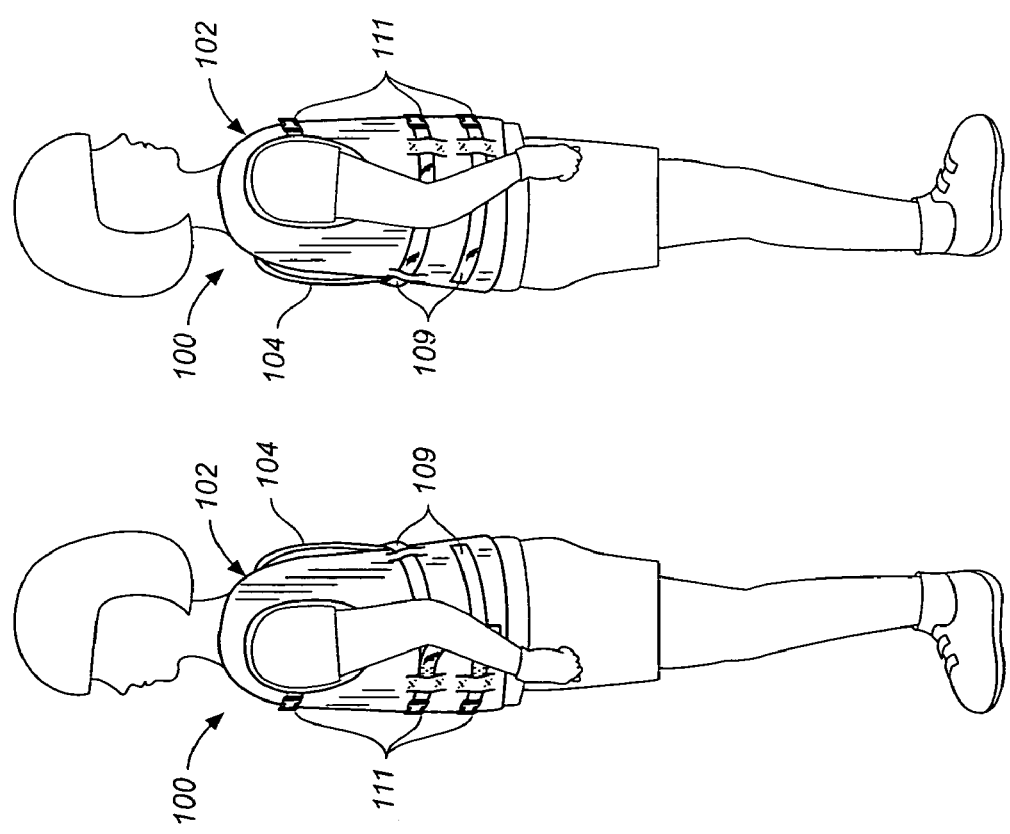

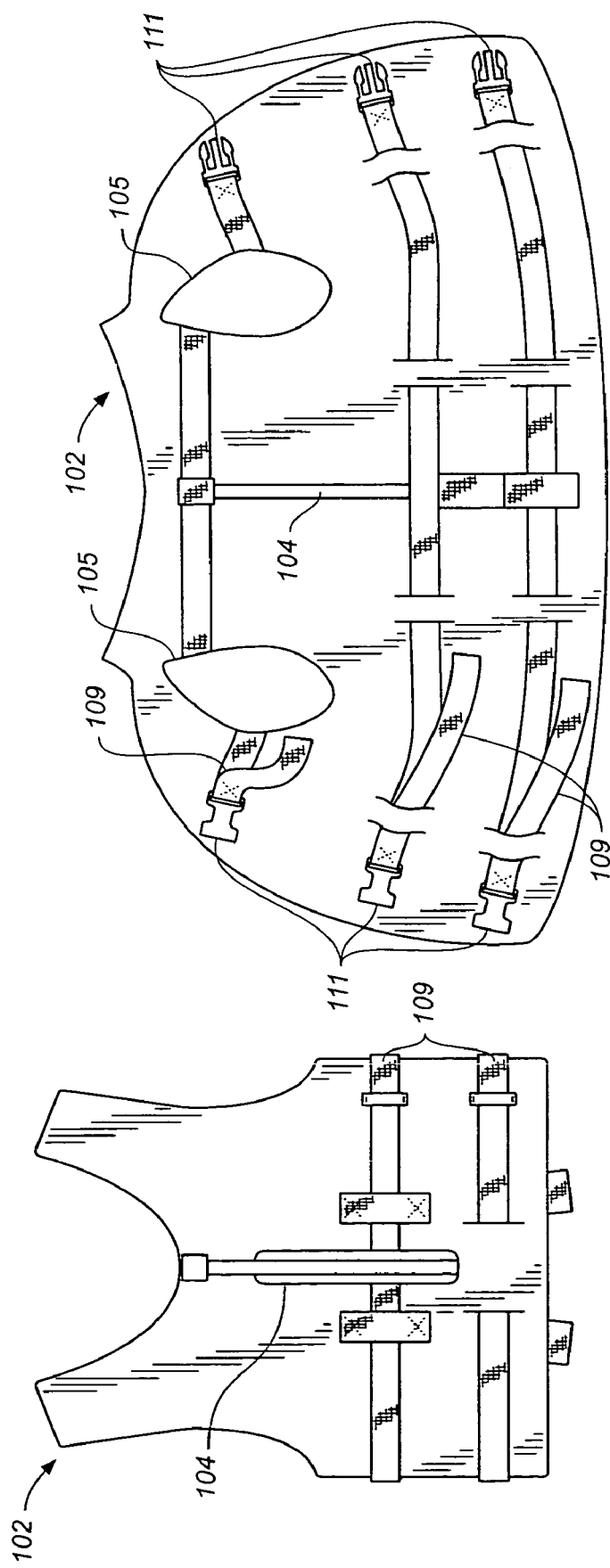

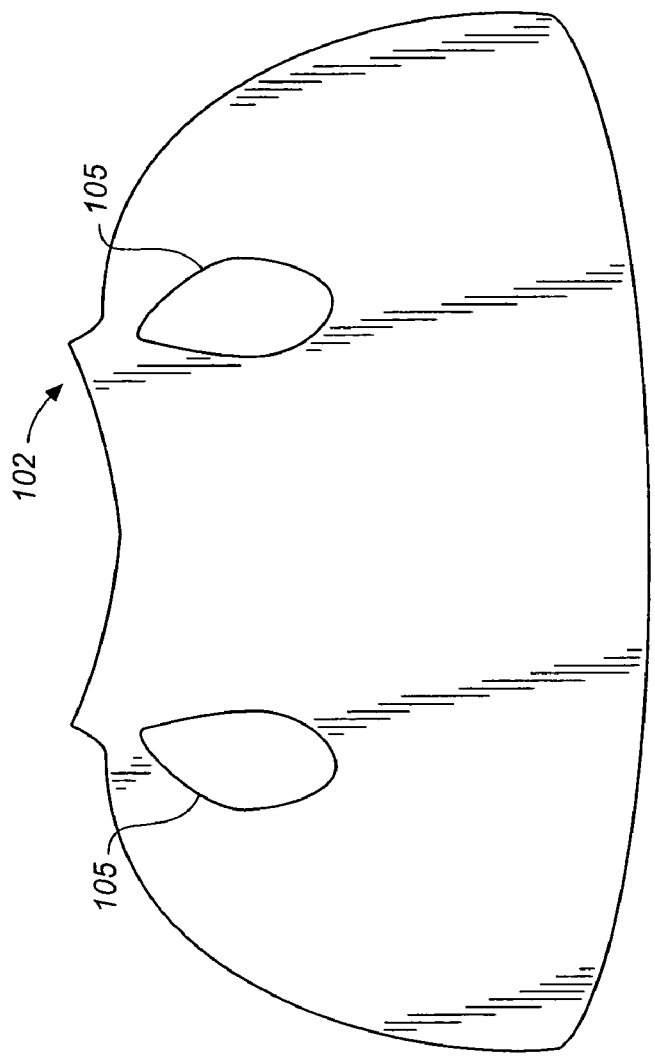
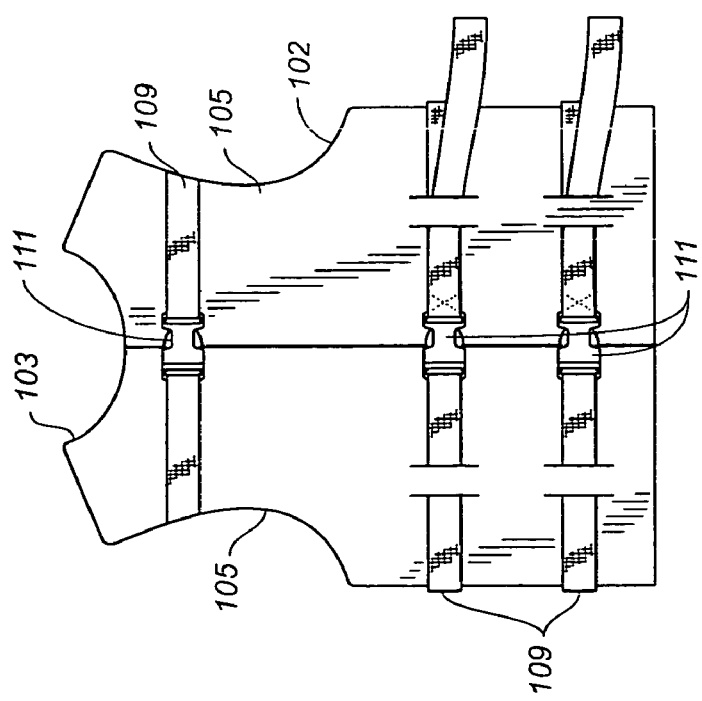
FIG._4A
FIG._4B

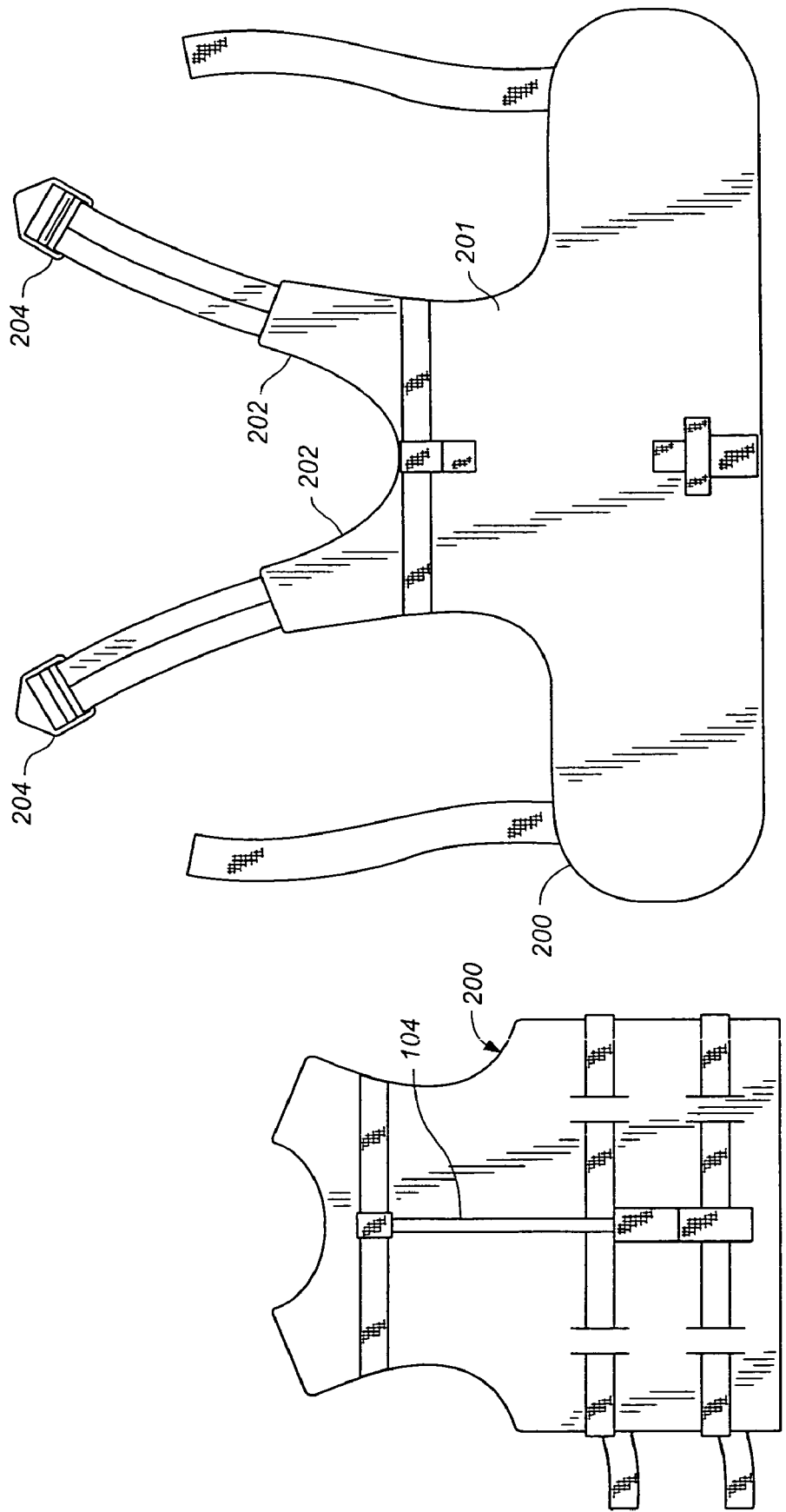

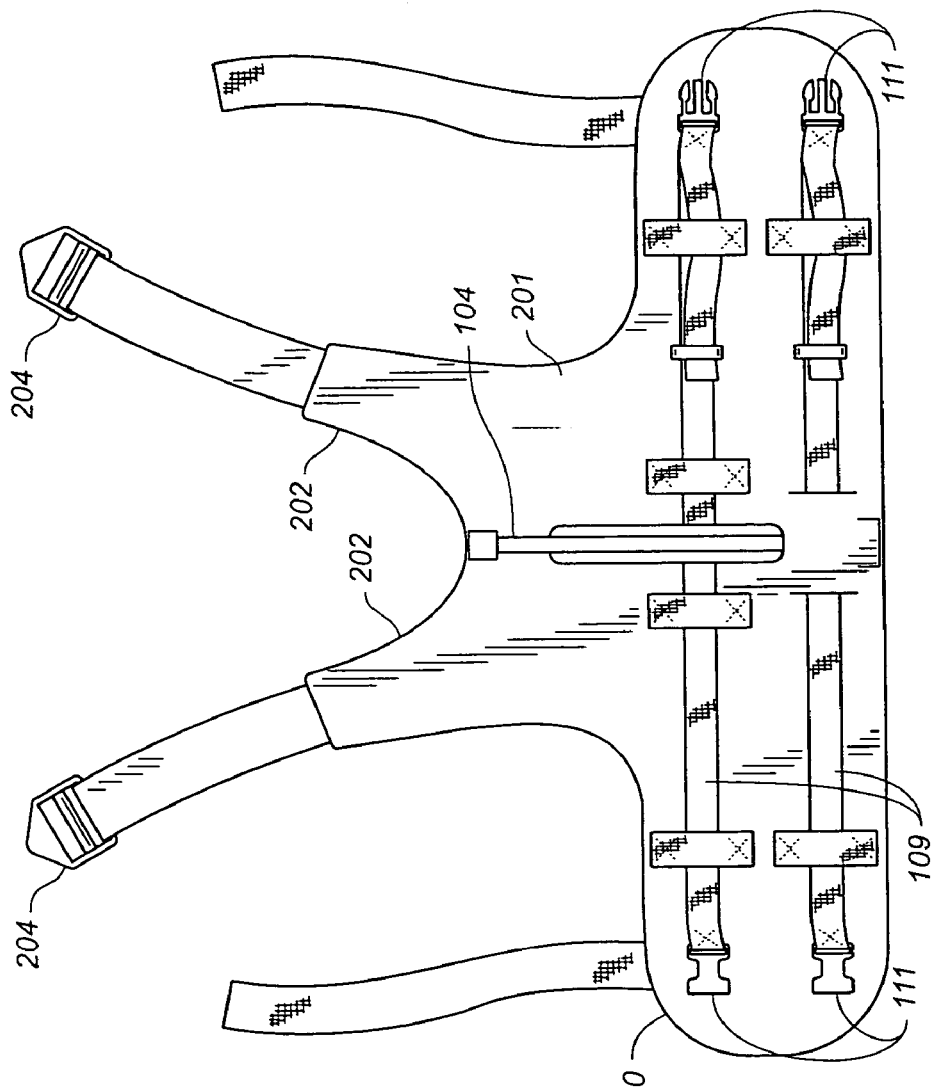
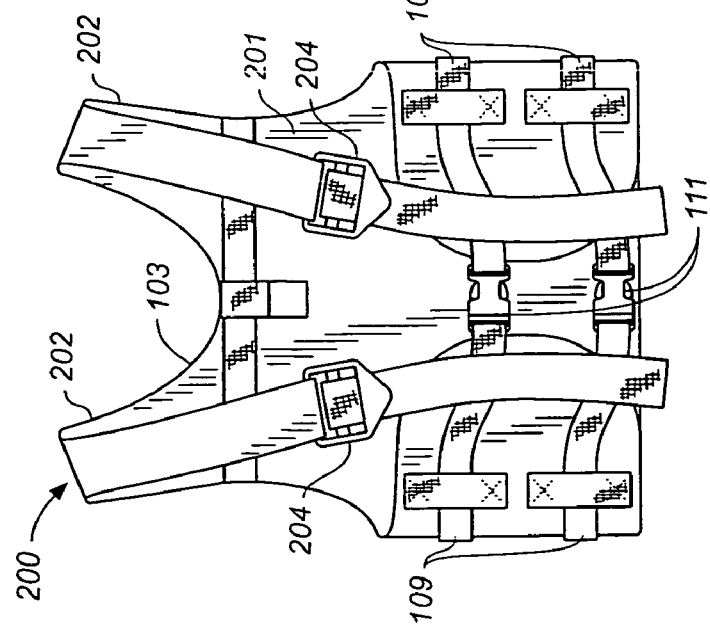
FIG._6B
FIG._6A

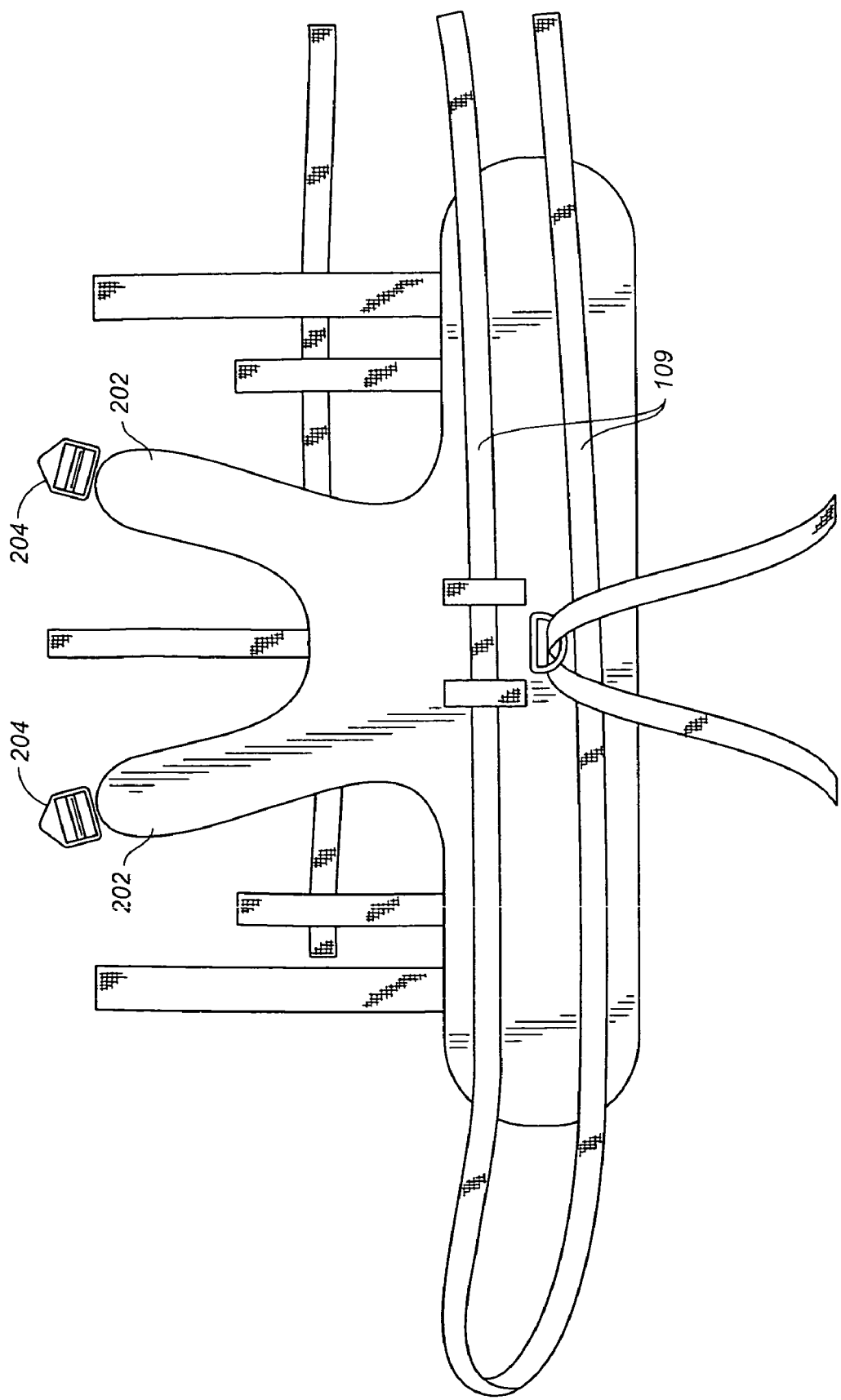
FIG._7

TRAINING GARMENT

The present application is based on and claims the benefit of U.S. provisional patent application Ser. No. 60/507,41, filed Sep. 30, 2003, the content of which is hereby incorporated by reference in its entirety.

BACKGROUND OF THE INVENTION

The present invention deals with a garment. More specifically, the present invention deals with a garment that is provided with a handle that can be used to train a person in the use of such things as bicycles, in-line roller skates, roller skates, skateboards, etc.

To date, children the world over have learned to ride a bicycle by what is essentially a two step process. In the first step, on either a tricycle, or bicycle with training wheels, the child masters the bio-mechanics of peddling and steering through generally unsupervised trial and error. In the second step, the child is aided by an adult, parent or older sibling who then takes over, in lieu of the training wheels, responsibility for holding the bicycle upright. Few children are able to ride unassisted immediately after having their training wheels removed. Thus, it is clear that having the bicycle held upright for them, either by training wheels or by the hand of the parent or adult instructor, does precious little to facilitate the child's learning to maintain the bicycle in balance beneath them, while posing in the case of the latter unnecessary risk of injury to both the child and the adult instructor or trainer.

Accordingly, several guidance apparatus have been developed with the aim of permitting a trainer to control the balance of an inexperienced rider during training. Of these, most are designed to be attached in some way to the bicycle itself. While the majority of those apparatus do serve to minimize the aforementioned risk to the child student and their adult instructor, each serves (much like training wheels) as mere means by which to hold the bicycle up, independent of the child student, the intended subject of the instruction. Also, invariably, assembly by the end user is required for these apparatus.

Alternately, there seem to be few prior devices which aim simultaneously to expedite the training of a child by an adult to maintain balance on a bicycle, while reducing the risk of strain or injury to the child or the adult trainer during the course of instruction by means of supporting the child independent of the bicycle. These, prior devices generally either fail to offer the adult/instructor adequate positive lateral control over the child student, or they fail to provide adequate safety advantages to render the devices either effective, or commercially viable.

Of the first and largest group, those training aides designed for attachment to a bicycle, the vast majority vary in small degree and rely on the design of various attachment mechanisms (for which assembly is required). A number of these types of systems are set out in U.S. Pat. Nos. 6,488,302 B2; 6,244,612 B1; 6,120,050; 5,395,130; 5,303,944; 5,154, 096; 4,903,975; 3,650,544.

Of the second group, or general type of bicycle training aids (those designed to support the child student independent of the bicycle), four will be described as being illustrative.

The first is set out in U.S. Pat. No. 5,226,820 entitled BICYCLE RIDING TRAINING DEVICE. The device amounts to little more than a length of rope looped around a child's waist and through a sliding handle of sorts held behind the child by the adult/instructor. This device offers the child little or no upper body support in a fall. Further, with no means of preventing the device from sliding around the child's waist, it offers the adult/instructor little or no lateral control over the child by which to guide the child away from impending obstacles or other hazards. Further, this device offers little more commercial viability than that of a length of rope available at any hardware store.

The second bicycle training aid is set out in U.S. Pat. No. 5,382,040 entitled BICYCLE TRAINING AID. The device comprises a "body member" or wooden board strapped to a child's back with a pivoting arm or handle mounted to the board perpendicular to the child's mid back. Implementation of the handle itself is ergonomically awkward, placing the hand of the instructor in a compromised position with the thumb over extended atop the horizontal handle. This poses a risk of injury to the instructor's hand, forearm or wrist and further injury to the child under subsequent loss of control on the part of the injured instructor. In the event of a fall, as with the device set out in U.S. Pat. No. 5,226,820, the board and straps of this device include no means of distributing the force of the straps over a broad section of the child's torso and so pose risk of injury to the child, while offering substantially no means for preventing the device from sliding around the child's torso. This reduces the already compromised lateral control offered to the instructor. As for fit, the device appears to be generally uncomfortable, for both the instructor and the child.

A third device is set out in U.S. Pat. No. 5,540,188 entitled TODDLER HARNES. This device comprises two padded loops of fabric connected adjacently by means of a "grasping portion" or handle of sorts. With one loop stretched across the child's chest, under the arms and up over the head from behind, and the other stretched across the child's back, under the arms and up over the head from the front. These crisscrossing loops depend on the child keeping his or her arms at their sides lest the whole thing slips off like any shirt when lifted from above by the would-be instructor. Further, held from well above the child's head, grasping hand held at shoulder height, the overlong loops offer the instructor little if any lateral control and generally render the device untenable for its stated alternate purpose as a bicycle training aid.

Another device is set out in U.S. Pat. No. 5,634,439 entitled BIKER RIDER BALANCE BELT. The device comprises a wide band of fabric secured about the child/student's upper torso, under the arms, with fabric strap type loops serving as handles in the back. This device, as with those set out in U.S. Pat. Nos. 5,226,820 and 5,382,040, offers no means by which to prevent the device from sliding around the child. This, coupled with the undesirable slack in the loop handles renders, negligible the lateral control, safety and overall utility offered by the device.

Other devices exist as well. For example, U.S. Pat. No. 5,074,795 entitled METHOD FOR TEACHING CHILDREN TO SKI, like U.S. Pat. No. 5,634,439, shows essentially a wide torso encircling band with two over-long slack loop handles or "reigns" by which an instructor exercises control over the child student. In addition, US Patent Application Publication Number US 2002/0096858 A1 describes yet another device for attaching a handle to a bicycle.

SUMMARY OF THE INVENTION

The present invention is a garment that is fastened about the torso of a user such that rotation of the garment about the user is inhibited. The garment also illustratively includes a handle extending from a back portion of the garment.

BRIEF DESCRIPTION OF THE DRAWINGS

FIGS. 1A-1D illustrate one embodiment of a device according to the present invention in use.

FIG. 2 illustrates a rear view of one embodiment of the present invention attached to a user.

FIG. 3 illustrates a rear view of one embodiment of the present invention both in the opened and the attached position.

FIG. 4 illustrates a front view of one embodiment of the present invention both in the open and in the attached positions.

FIG. 5A illustrates a rear view of another embodiment of the present invention in the attached position.

FIG. 5B illustrates a front view of the embodiment illustrated in FIG. 5A in the open position.

FIG. 6A shows the embodiment of the present invention illustrated in FIGS. 5A and 5B, from the front, in the attached position.

FIG. 6B illustrates the embodiment shown in FIGS. 5A-5A, from the rear, in the open position.

FIG. 7 illustrates one embodiment of a rigging system used to rig straps for the present invention.

DETAILED DESCRIPTION OF THE ILLUSTRATIVE EMBODIMENTS

The present invention is a garment which is fastened about the torso of a user in such a way that rotation of the garment about the user is inhibited. The garment also has a handle extending from a back portion of the garment such that the garment can be grasped by a second user, accompanying the person wearing the garment. The garment is thus used in training the person wearing the garment to maintain balance or accomplish some task that requires balance. For example, the garment can be used in assisting a child to ride a bike, ski or use roller skates, skateboards, scooters, etc.

The garment illustratively extends about the extremities of the person wearing the garment to inhibit rotation of the garment about the torso of that person. In one embodiment, the garment extends about the arms and shoulders of the person wearing the garment to inhibit rotation about the torso. However, in other embodiments, the garment could just as easily extend about the legs of the user to inhibit rotation.

FIGS. 1A-1D illustrates one illustrative embodiment of the garment 100 in accordance with the present invention. It can be seen from the illustrations in FIGS. 1A-1D that garment 100 includes a vest portion 102 that extends about the torso of the user and about the upper extremities of the user. Vest portion 102 defines a neck opening 103 at its upper end that fits around the neck of the wearer. Vest portion 102 also defines arm openings 105 to receive therethrough the arms of the wearer. Further, torso opening 107 at the lower end of vest portion 102 is sized to extend about the torso of the wearer. This configuration allows the vest portion 102 to fit snuggly about the torso of the user, and also inhibits rotation of the vest portion 102 about the torso of the user, during use.

The illustration FIGS. 1A-1D also shows that garment 100 includes a handle 104 which extends from, but is securely attached to, the back portion of vest 102. In one illustrative embodiment, the handle has sufficient firmness that it maintains its shape, extending away from the user's back, during use and when under no external forces. This allows handle 104 to be easily grasped by the person accompanying the user, in order to assist the user in learning and maintaining balance.

However, handle 104 also illustratively has some resilience such that, if the user happens to lean against an object, or even be in a position lying on their back, the handle will deform, at least somewhat, to absorb some of the force applied to the user's back, through the handle. This enhances comfort of device 100.

In addition, in one embodiment, handle 104 is attached to vest portion 102 of garment 100 with a wide, generally planar, mount that generally conforms to a portion of the user's back. This acts to distribute any force imparted to the user's back through handle 104, across the user's back. Of course, the mount can extend out beyond the handle 104 by any desired amount and can be padded or made with the same materials as handle 104 or a different material. The mount can be stitched to vest portion 102, or connected another way, and can be fixedly or removeably connected to handle 104.

In one illustrative embodiment, the handle 104 can be made from relatively soft rubber or rubber tubing. The handle 104 can also be made from nylon, plastic, or other synthetic materials or polymers. Similarly, handle 104 can be formed of a relatively rigid material, but coated with rubber, foam, or other padding to enhance comfort.

It should also be noted that the exact formation of handle 104 can take a wide variety of different forms. For instance, and as is shown in FIG. 1, handle 104 can form a generally closed loop on vest 102 wherein both ends of handle 104 are attached to vest 102 with the grasping portion of handle 104 defined between its ends. However, handle 104 could also simply form an open curve, that terminates at a point that is out of contact with vest 102 or a corresponding mount. For instance, the handle 104 could simply be "comma" shaped extending through approximately 90 degrees of an arch beginning at the back of vest 102 and extending out and away from the back of vest 102 generally toward a lower end of vest 102. Other handle configurations can be used as well.

Similarly, handle 104 can either be fixedly attached to vest 102, or disconnectably attached to vest 102. If it is disconnectably attached, a snap lock or other similar locking system is illustratively provided such that, during use, handle 104 cannot become inadvertently disconnected from vest 102.

Vest 102 is, in one illustrative embodiment, similar to a water skiing vest which has a plurality of straps extending through loops around the vest structural material. The straps have a connection mechanism which allows their ends to be connected to one another near the front portion of vest 102. For instance, the ends of the straps may have strap locks that allow them to be fastened about the vest structural material to hold it in place. Of course, the strap need not extend all the way around the back of the vest but can instead be a shorter strap fastened to the front of the vest. Also, other locking fasteners can be used as well, such as hook and loop fastener, buttons, snaps, releasable adhesives, etc.

During use, the user wearing the garment 102 snuggly secures the vest portion 102 about their torso and extremities. The person accompanying the user then either walks along side the user or places his or her hand on handle 104 to provide guidance to the user. In the event that the user looses his or her balance, the person accompanying the user can quickly use handle 104 to stabilize or support the user, thereby reducing the likelihood that the user will suffer injury. However, because the handle 104 is located on the back of vest portion 102, it is in a position which is ergonomically much more beneficial to the person accompanying the user than in past systems. Thus, the present invention also reduces the likelihood that the person accompanying the user will suffer any type of injury (such as back strain, etc.).

FIG. 2 shows a rear view of one embodiment of device 100 fastened to a user. FIG. 2 shows that vest portion 102 illustratively includes shoulder straps 106 and 108 which extend upward and about the upper extremities of the user, defining arm openings 105 and part of head opening 103. This acts to inhibit rotation of vest portion 102 about the torso of the user. FIG. 2 also shows that, in one embodiment, handle 104 is fastened to a substructural strap assembly (or harness) and mount 110 that extends about the torso of the user, within the garment layers of vest 102. This acts to more securely fit mount 110 (and thus handle 104) to the user. This allows for increased ability to support the user with the handle, without garment 100 rotating optionally about the user's torso. In addition, FIG. 2 shows a pair of stiffeners (shown in phantom) that are disposed on either side of handle 104. The stiffeners are illustratively lightweight stiffening material (such as aluminum or polymer tubes or the like) that are connected to vest portion 202. The stiffeners can be sewn or quilted into the harness or vest, or otherwise attached to the harness or vest or both, and act to provide additional support to handle 104 along the spine of the user.

FIG. 3 shows one embodiment of vest portion 102 in the open position, and in the closed position (the position used for attaching it to a user), both from the rear of device 100. It can thus be seen that the straps 109 of the device can optionally run around the exterior of the vest portion 102 of the garment 100. However, it should be noted that the straps 109 could run around the interior of the garment 100, fastened to the garment in the way shown in FIG. 3 as well. Similarly, the straps could extend around the user between layers of the garment 100, in yet another embodiment. FIG. 3 also shows snap-type fasteners 111 on the ends of the straps 109 which are used to fasten the ends of the straps togheter.

FIG. 4 illustrates the garment 100 shown in FIG. 3, both in the open and closed positions, but this time from the front of the garment.

FIGS. 5A-6B illustrate yet another embodiment of the present invention. While the embodiment shown in FIGS. 3 and 4 is formed generally as a vest portion 102, the embodiment shown in FIGS. 5A-6B is formed more in the form of a belt portion 200 that is disposed around the torso of the user, along with a back portion 201 and a pair of shoulder straps 202 that extend about the shoulders and upper extremities of the user to define the head and arm openings. FIG. 5A illustrates belt portion 200 from the rear, in the closed position and FIG. 5B shows belt portion 200 from the front, in the open position. FIG. 6A shows belt portion 200 from the front in the closed position while FIG. 6B shows belt portion 200 from the rear in the opened positioned. As can be seen from FIGS. 5A-6B, shoulder straps 202 have fasteners 204 at their distal ends which fasten to the belt on the front side of the user.

FIG. 7 illustrates one embodiment of a rigging that can be employed for the straps used in accordance with one embodiment of the present invention.

It can thus be seen that the present invention provides a training aid which has sustainable commercial liability, and is designed to assist a user in developing balance, coordination, and muscle memory required to do such things as ride a bicycle, skate, roller skate, ski, ride a skateboard, etc.

The present system does this while reducing the risk of back strain or other bodily injury to the person assisting the user. Garment 100 is illustratively adjustable at the waist and shoulders for a snug, but comfortable fit by means of sliding plastic buckles, or the like. The vest portion or belt portion of the present invention can be made of substantially any desirable material, which can be padded or stiffened with inserts or material additions to enhance its structural integrity. The garment 100 illustratively includes an ergonomic, semi-ridged generally vertically extending handle that is secured to the user such that it is positioned between the shoulder blades of the user and just below the nape of the user's neck. This allows the user to be supported, as well as guided, by a person accompanying the user. If need be, the user can also be held safely adverting the perils of a fall while learning.

Also, while the invention has been described as having an open front, closable with straps, zippers, hook and loop fabric, or the like, this need not be the case. Instead, the torso engaging portion can be a pull-over type of garment either with, or without, sizing straps or other sizing mechanisms.

It should also be noted that the present invention can be implemented using a trouser-type support structure instead of a vest-type support structure. The trouser-type support structure would have a conventional opening for receiving the torso of the user and leg openings for extending about the upper legs of the user. This inhibits the device from rotating about the torso of the user, and the handle 104 can then be placed in the lower back, attached to the trouser portion. Similarly, this trouser arrangement can be attached to the vest shown in garment 100 (or formed integrally therewith) such that the device is a combined vest and trouser garment with the handle located on the back thereof.

Although the present invention has been described with reference to preferred embodiments, workers skilled in the art will recognize that changes may be made in form and detail without departing from the spirit and scope of the invention.

What is claimed is:

1. A vest consisting of:
   a torso engaging portion having a front and a rear and defining one or more openings for receiving therethrough one or more extremities of a user;
   a handle coupled to the center of the rear, and extending away from, the rear of the torso engaging portion, the handle including a mount constructed of a material more rigid than the torso engaging portion and disposed to distribute forces applied through the handle, across a user-engaging area that is larger than a user-engaging area defined by the handle; and
   a fastener, coupled to the handle and disposed for fastening the torso engaging portion about the torso of the user.

2. The vest of claim 1 wherein the fastener comprises:
   a plurality of straps coupled to the torso engaging portion and having connectors for connecting the straps to hold the torso engaging portion about the torso of the user.

3. The vest of claim 1 wherein the handle is formed of a resilient material.

4. The vest of claim 1 wherein the torso engaging portion comprises a vest.

5. The vest of claim 1 wherein the torso.

6. The vest of claim 1 wherein the handle has a grasping portion thereof biased to a position spaced from the rear of the torso engaging portion.

7. The vest of claim 6 wherein the handle has a first end thereof attached to the torso engaging portion and wherein the grasping portion is spaced along the handle from the first end.

8. The vest of claim 7 wherein the handle has the first end thereof and a second end thereof attached to the torso engaging portion and wherein the grasping portion is along the handle between the first and second ends thereof.

9. A vest consisting of:
   a torso engaging portion having a front and a rear and defining one or more openings for receiving therethrough one or more extremities of a user;
   a handle coupled to the center of the rear, and extending away from, the rear of the torso engaging portion, the handle including a mount constructed of a material more rigid than the torso engaging portion and disposed to distribute forces applied through the handle, across a user-engaging area that is larger than a user-engaging area defined by the handle, wherein the handle has a grasping portion thereof biased to a position spaced from the rear of the torso engaging portion, wherein the handle has a first end thereof attached to the torso engaging portion and wherein the grasping portion is spaced along the handle from the first end, and wherein the handle has the first end thereof and a second end thereof attached to the torso engaging portion and wherein the grasping portion is along the handle between the first and second ends thereof.

* * * * *

UNITED STATES PATENT AND TRADEMARK OFFICE
CERTIFICATE OF CORRECTION

PATENT NO. : 7,225,472 B2  Page 1 of 1
APPLICATION NO. : 10/955845
DATED : June 5, 2007
INVENTOR(S) : Terry O. McDonald, Jr. et al.

It is certified that error appears in the above-identified patent and that said Letters Patent is hereby corrected as shown below:

In the Abstract please remove the second that from the text as follows:

The present invention is a garment that is fastened about the torso of a user such that [that], rotation of the garment about the user is inhibited. The garment also illustratively includes a handle extending from a back portion of the garment.

In the claims:

Claim 5 please add the following text:

The vest of claim 1 wherein the torso "engaging portion comprises a vest".

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,225,472 B2 | Page 1 of 1 |
| APPLICATION NO. | : 10/955845 | |
| DATED | : June 5, 2007 | |
| INVENTOR(S) | : Terry O. McDonald, Jr. et al. | |

It is certified that error appears in the above-identified patent and that said Letters Patent is hereby corrected as shown below:

Title Page, Item (57) In the Abstract please remove the second "that" from the text as follows:

The present invention is a garment that is fastened about the torso of a user such that [that], rotation of the garment about the user is inhibited. The garment also illustratively includes a handle extending from a back portion of the garment.

In the claims:

Column 6, line 64, Claim 5 should read:

--The vest of claim 1 wherein the torso engaging portion comprises a vest.--

This certificate supersedes the Certificate of Correction issued August 24, 2010.

Signed and Sealed this

Twenty-eighth Day of September, 2010

David J. Kappos
*Director of the United States Patent and Trademark Office*